United States Patent Office 2,721,189
Patented Oct. 18, 1955

2,721,189

POLYMERIC BICYCLO-(2,2,1)-2-HEPTENE

Arthur William Anderson and Nicholas George Merckling, Wilmington, Del., assignors to E. I. du Pont de Nemours and Company, Wilmington, Del., a corporation of Delaware No Drawing. Application August 30, 1954,
Serial No. 453,144

1 Claim. (Cl. 260—93.1)

This invention relates to a novel solid hydrocarbon polymer, poly-bicyclo(2,2,1)-2-heptene.

Numerous normally solid hydrocarbon monoolefin polymers have been known heretofore, notable among which are polyethylene, polystyrene, and polyisobutylene. Cycloalkenes, on the other hand, have not heretofore been known to be convertible to high molecular weight addition polymers, although they have been polymerized to various oily products.

In copending U. S. patent application S. N. 450,243, filed August 16, 1954, novel catalysts which are suitable for use in converting ethylene to solid polymers are disclosed. The said catalysts contain titanium and are preferably formed by reaction of a titanium compound having a valence state in excess of two, with a reducing agent as hereinbelow explained. Some of the catalysts of this character which are extremely active are of a pyrophoric character, and are capable of converting ethylene to solid polymers at room temperature and atmospheric pressure.

It has been found in accordance with the present invention that the said catalysts are also capable of converting bicyclo(2,2,1)-2-heptene to a solid polymer. In specific embodiments, it has been found that titanium compounds having a valence state of two, which may be combined with two radicals (suitable examples being alkoxy radicals, alkyl radicals, and radicals which form acids when combined with hydrogen), can be used effectively in the polymerization of bicyclo(2,2,1)-2-heptene. Said divalent titanium is generally obtained by admixing a titanium compound having a valence state in excess of two with a reducing agent. The quantity of reducing agent which is generally suitable is sufficient to convert the titanium at least in part to a valence state of two. A test for divalent titanium, which defines the presence or absence thereof, is the ability of the divalent titanium to react with liquid water to form hydrogen.

It is believed that coordination complexes are formed in the polymerization mixtures. The nature of these coordination complexes is not fully understood, but they are quite probably the active catalysts or catalyst components which are capable of initiating the polymerization in an extremely active manner to produce solid polymers.

By complexing or combining with various components it is possible to control molecular weight of the polymer. The complexes are difficult to isolate in a pure state, but their presence can be indicated by the chemical properties of the mixtures produced when a titanium compound having a valence state above 2 is reduced at least in part to a valence state of 2 and admixed with an ingredient, such as a compound containing ethylenic unsaturation, which can form a complex with the titanium in its low state of valence.

The formation of solid polymers in accordance with this invention in the presence of the catalysts herein disclosed can be carried out under extremely mild conditions. It is of course also possible to employ moderately high pressures, suitably from 1 to 200 atmospheres or higher. Much higher pressures, up to several thousand atmospheres, can be employed, but it is not economically desirable to do this in view of the extraordinary activity of the catalysts at lower pressures. Similarly, extremely low temperatures may be employed. The preferred temperatures, however, are within the range of about 0° to 300° C.

The polymerization of bicyclo(2,2,1)-2-heptene according to the process of this invention, takes place most satisfactorily when the polymerization mixture is substantially moisture-free and also free of other sources of hydroxyl groups. Since water reacts with the catalyst, as hereinabove explained, the water content of the mixture should be kept at the lowest practicable minimum. The same is true of carbon dioxide. The polymerization mixture in the process of this invention is preferably kept free of oxygen since oxygen reacts with the catalyst. In practical operations, the oxygen content should preferably be held below 20 parts per million. Certain compounds which need not be polymerizable and which are capable of coordinating with the titanium at a valence state of 2 form complexes which are too stable for optimum results, and accordingly, the presence of these compounds should preferably (although not necessarily) be avoided. In this category are ketones and esters. Hydrocarbon solvents, on the other hand, can be used quite effectively.

Among the reducing agents which are most effective for reducing the valence of the titanium to an average of below 3, the following may be mentioned:

(1) Grignard reagents.
(2) Metal alkyls or aryls and similar organo-metallic compounds.
(3) Metal hydrides.
(4) Alkali metals and alkaline earth metals, etc.

In specific embodiments, the polymerization mixtures especially those employing inert solvents, such as hydrocarbons, are homogeneous and contain the active coordination complex in a dissolved form. These homogeneous catalyst systems have certain advantages over heterogeneous catalyst systems. In the homogeneous systems, the polymerization takes place very readily in the presence of a relatively small amount of the catalyst. In contrast with this, a somewhat larger quantity of catalyst is necessary if a heterogeneous system is employed especially if the effective surface area of the catalyst is not extremely large. Good results are obtained when the catalyst is colloidally dispersed.

The invention is illustrated further by means of the following examples:

Example I

Into a shaker tube was placed 10 grams of bicyclo (2,2,1)-2-heptene and 0.03 mole ethyl magnesium bromide, dissolved in 25 ml. toluene. The mixture was warmed to 50° C., and into it was injected 0.015 mole TiCl4 in toluene. The tube was closed and the contents were heated for four hours while the temperature was raised to 160° C. The products were removed from the tube and admixed with an acetone—HCl mixture (about equal quantities of acetone and concentrated hydrochloric acid) to precipitate and remove impurities from the polymer. The resulting polymer was thereupon washed several times with the acetone—HCl mixture and vacuum dried. It was a solid which, however, contained oily components. The oily portion was extractable with boiling xylene. This produced a polymer which did not melt when heated up to its decomposition temperature (ca. 300° C.). Films shaped from the polymer at that temperature were quite brittle. When plasticized with the xylene extractable oil, the polymer could be molded quite readily at temperatures of 120° to 200° C.

Example II

Into a flask was charged 4.5 grams of LiAlH$_4$, about 40 grams of butene-1, and 100 ml. of heptane. This mixture was heated at 100° C. for ½ hour, 110° C. for 1 hour, and 115° C. for 1 hour. The resulting mixture was a solution of LiAl(butyl)$_4$. To this was added 100 ml. of n-heptane. To 40 ml. of this solution of LiAl(butyl)$_4$ was added 1.9 grams (0.0 mole) of TiCl$_4$ in 50 ml. of cyclohexane in a reaction flask. 30 grams of bicyclo-(2,2,1)-2-heptene was added to this catalyst and after 2 hours at 75° C., 21 grams of solid poly-bicyclo(2,2,1)-2-heptene was obtained by filtration and washing followed by drying.

The poly-bicyclo(2,2,1)-2-heptene, prepared as above described is useful as a component of insulating compositions, and as a polymer additive.

What is claimed is the following:

Normally solid poly-bicyclo(2,2,1)-2-heptene, characterized in that it does not melt when heated to a decomposition temperature of 300° C.

References Cited in the file of this patent

UNITED STATES PATENTS 2,405,558   Borglin _____ Aug. 13, 1946

OTHER REFERENCES

Kharasch: C. A. 47, 3253–4 (1953).